Patented Feb. 7, 1939

2,146,343

UNITED STATES PATENT OFFICE 2,146,343

HEAT TRANSFER AGENT

Jerome Martin, Terre Haute, Ind., assignor to Commercial Solvents Corporation, Terre Haute, Ind., a corporation of Maryland No Drawing. Application November 23, 1936, Serial No. 112,285

4 Claims. (Cl. 252—5)

My invention relates to new liquid heat transfer compositions. More particularly, it relates to new heat transfer compositions comprising the nitration compounds of the saturated non-benzenoid hydrocarbons, such as, for ethane, propane, and butane.

Many different liquids and solutions have been proposed in the past for use as heat transfer agents to take the place of water. In most instances where heat transfer agents are required suitable solutions are desirable which will remain liquid at extreme low and high temperatures. All of those proposed by previous investigators have had one or more properties that made them undesirable for the purpose in question. In order for a liquid substance to be used to the best advantage as a heat transfer agent it should preferably have the following properties: high boiling point, low freezing point, low viscosity throughout the temperatures at which used, low volatility, freedom from objectionable odor, freedom from decomposition or polymerization at high temperatures, non-corrosive action on metals or materials in the cooling system, freedom from materials that tend to stop up the system and a high specific heat.

I have now found that the nitration products of the saturated non-benzenoid hydrocarbons satisfy the above requirements to such a degree as to make them suitable for use as heat transfer agents. In addition, these compounds possess the important special advantage of forming slushes rather than solid crystalline compositions at low temperatures. This is particularly the case where use is made of mixtures of the crude material obtained by the direct nitration of saturated non-benzenoid hydrocarbons. The pure nitro hydrocarbon, if desired, may be obtained from such mixtures by fractionation, or other suitable means, and may be used in either the pure form or mixed with other added nitro hydrocarbons or still other material, to give heat transfer agents of particular desired properties.

The nitro hydrocarbons may be obtained by any suitable means. The preferred method, however, is that of U. S. Patent No. 1,967,667 which discloses a method for the production of nitro hydrocarbons by the direct vapor phase nitration of saturated non-benzenoid hydrocarbons. When, for example, propane is nitrated in accordance with this process and the resulting mixture of nitro compound is separated from the water layer present and washed with a saturated solution of sodium bi-carbonate to remove the acids present, the final resulting solution consists substantially of a mixture of nitromethane, nitroethane, 1-nitropropane, 2-nitropropane, and a small amount of water. This mixture remains liquid and of low viscosity below —60° C. and does not tend to form a hard crystalline mass near the solidification temperature, but instead forms a slush.

When n-butane is nitrated and washed as indicated in the previous example, and the resulting product subjected to fractional distillation, the various fractions consist principally of nitromethane, nitroethane, 1-nitropropane, 2-nitrobutane, and 1-nitrobutane. These materials may be used either singly or mixed with various other nitroparaffins, or other substances, as heat transfer agents.

The use to which the material is to be applied will determine the particular nitro hydrocarbon to be selected as obviously the physical properties of the various members of the series vary somewhat. For example, the 1-nitrobutane melts at below —50° C. and boils at 151° C., whereas its isomer, the tertiary nitrobutane, melts at +25° C. and boils at 126° C.

It is understood, of course, that my invention is not limited to the particular nitro hydrocarbons enumerated above, but includes the nitration products of other non-benzenoid hydrocarbons, such as cyclopropane, pentane, octane, etc.

Now having described my invention, what I claim is:

1. A heat transfer process which comprises effecting thermal contact of a heat transfer agent, comprising a nitro hydrocarbon of saturated non-benzenoid structure, first with a high temperature zone and subsequently with a lower temperature zone.

2. A heat transfer process which comprises effecting thermal contact of a heat transfer agent, comprising a mixture obtained by the direct nitration of a saturated non-benzenoid hydrocarbon, first with a high temperature zone and subsequently with a lower temperature zone.

3. A heat transfer process which comprises effecting thermal contact of a heat transfer agent, comprising a nitroparaffin, first with a high temperature zone and subsequently with a lower temperature zone.

4. A heat transfer process which comprises effecting thermal contact of a heat transfer agent, comprising a mixture of nitroparaffins, first with a high temperature zone and subsequently with a lower temperature zone.

JEROME MARTIN.